United States Patent [19]

Gabriel et al.

[11] Patent Number: 4,877,135

[45] Date of Patent: Oct. 31, 1989

[54] COLLATED NAIL STRIP

[76] Inventors: William L. Gabriel, 78 Lakeview Pkwy., Barrington, Ill. 60010; Reinhold Meditz, 1136 Stanton Rd., Lake Zurich, Ill. 60047

[21] Appl. No.: 248,724

[22] Filed: Sep. 26, 1988

[51] Int. Cl.$^4$ .......................................... B65D 85/24
[52] U.S. Cl. ................................. 206/344; 206/338; 206/345
[58] Field of Search ............... 206/338, 343, 344, 345, 206/813; 411/442, 443

[56] References Cited

U.S. PATENT DOCUMENTS

| | | | |
|---|---|---|---|
| 3,276,576 | 10/1966 | Langas et al. | 206/344 |
| 3,442,374 | 5/1969 | Hillier | 206/344 |
| 3,592,339 | 7/1971 | Briggs, Jr. | 206/345 |
| 3,851,759 | 12/1974 | Young et al. | 206/338 |
| 3,966,042 | 6/1976 | Shelton et al. | 206/338 |
| 4,343,579 | 8/1982 | Shelton et al. | 206/345 |
| 4,679,975 | 7/1987 | Leistner | 206/343 |

*Primary Examiner*—David T. Fidei

[57] ABSTRACT

A substitute strip of collated nails having cylindrical shanks of an uniform diameter, which is smaller than the uniform diameter of the shanks of the nails of a standard strip, and being collated by a pair of tapes. Each tape extends across the nail shanks and is adhered by an adhesive layer to a respective one of diametrically opposed areas on the shank of each nail of the substitute strip. As distinguished from the standard strip, at least one tape of the substitute strip has an outer rib extending along such tape. Because of the outer rib or outer ribs, the substitute strip and the standard tape can be interchangeably fed by a nail-feeding magazine of a rapidly acting, nail-driving tool.

8 Claims, 1 Drawing Sheet

COLLATED NAIL STRIP

BACKGROUND OF THE INVENTION

This invention pertains generally to a strip of collated nails for use in a nail-feeding magazine of a pneumatically powered, combustion-powered, or other rapidly acting, nail-driving tool.

A common method of collating nails for use in such a magazine is disclosed in Langas et al. U.S. Pat. No. 3,276,576. The nails, which have vull heads and cylindrical shanks, are collated by a pair of tapes of a uniform thickness. Each tape extends across the nail shanks and is adhered to a respective one of diametrically opposed areas on the shank of each nail in the strip. Heat-sensitive adhesive is used to adhere the tapes to the shank areas.

As illustrated and described in the Langas et al. patent noted above, the nails may be alternatively disposed with their heads in a tiered relationship or with their heads in a coplanar relationship, a tiered relationship being typical. It is not necessary for the nails to have full heads. D-shaped, so-called clipped heads are known, which allow spacing between successive nails to be substantially reduced, particularly but not exclusively if their heads are in a tiered relationship. See, e.g., Shelton et al. U.S. Pat. No. 3,966,042, which discloses collated nails having D-shaped heads.

Because the shanks have a uniform diameter and the tapes have a uniform thickness, an overall thickness of the strip of collated nails, as measured at the collating tapes, can be precisely controlled within normal manufacturing tolerances. Thus, a nail-feeding magazine of a nail-driving tool, a discussed above, can be dimensionally adapted to feed a strip having an overall thickness, as measured similarly, which is selected so as to enable the nail-feeding magazine to feed the strip without allowing the shanks of the nails to wobble excessively.

If the shanks of the nails were to wobble excessively, the nail-driving tool might be easily jammed, particularly but not exclusively if plural strips were loaded serially so as to reside simultaneously in the nail-feeding magazine whereupon such strips could cross over, i.e., move out of a coplanar relationship between nail axes of a preceding strip and nail axes of a following strip.

An improved collating method of related interest, wherein a filament is disposed under compression between the nail shanks so as to maintain spacing therebetween, is disclosed in Shelton et al. U.S. Pat. No. 4,343,579.

A limitation of such collating methods, heretofore, has been that a nail-driving tool having a nail-feeding magazine adapted to guide a strip of collated nails having shanks of a given diameter, as collated by tapes of a given thickness, could not be ordinarily used to feed a stirp of collated nails having shanks of a smaller diameter, since the smaller shanks would tend to wobble excessively and to jam the nail-driving tool. Conversely, such a strip of collated nails having shanks of a given diameter could not be ordinarily fed by a nail-feeding magazine that was oversized, i.e., sized for such a strip of collated nails having shanks of a larger diameter.

A collating method of related interest is disclosed in Leistner U.S. Pat. No. 4,679,975. The nails are collated by a wire, which is welded to one side of the nail shanks, or by a pair of such wires, each of which is welded to one side of the nail shanks. Each wire is coated with a layer of thermoplastic or other material. In one embodiment, as shown in FIG. 7, the coating layer appears to have been applied as a strip.

SUMMARY OF THE INVENTION

This invention, which overcomes the limitation noted above without adding excessive amounts of collating material, provides a strip of collated nails having cylindrical shanks of a uniform diameter and being collated by at least one pair of tapes. Each tape of each pair extends across the nail shanks and is adhered, preferably by an adhesive layer, to a respective one of diametrically opposed areas on the shank of each nail. At least one tape of at least one such pair has an outer rib extending along such tape.

Preferably, each tape of at least one such pair has an outer rib extending along such tape. The rib structure is provided by an elongated strip of paper or other material extending along the strip of nails and held thereagainst by the tape. Preferably, the nail strip has a pair of threadlike strips extending along the tapes of each pair having the outer ribs, respectively between the tapes having the outer ribs and the shanks of the nails, and underlying the outer ribs. Preferably, the threadlike strips are made of compressed paper, as attached to the nail shanks solely by the tapes and the adhesive layers. Preferably, the respective tapes have paper substrates, which may be desirably coated with a polymeric material providing enhanced lubricity.

The collated nail strip provided by this invention is useful, as a substitute strip, in a nail-feeding magazine, which is adapted to feed a standard strip of collated nails having cylindrical shanks of a uniform diameter larger than the diameter of the shanks of the nails of the substitute strip and being collated by at least one pair of tapes, each tape of each pair of tapes of the standard strip extending across the nail shanks of the standard strip and being adhered to a respective one of diametrically opposed areas on the shank of each nail of the standard strip.

Each outer rib compensates for the shanks of the nails of the substitute strip being of a smaller diameter than the shanks of the nails of the standard strip so as to enable the nail-feeding magazines to feed the substitute strip without allowing the shanks of the nails of the substitute strip to wobble excessively, even if plural strips are loaded serially so as to reside simultaneously inn the nail-feeding magazine, whereby risks of jamming due to the oversized magazine are minimized.

Because of the outer rib or outer ribs, the substitute strip and the standard strip can be interchangeably fed by nail-feeding mechanism of a rapidly acting, nail-driving tool, which thus has enhanced utility.

Outer ribs that do not extend over full widths of the tapes having outer ribs are preferred over thicker tapes, which would add excessive amounts of collating material entailing excessive risks of flagging, i.e., of catching fragments of the collating material beneath the heads of the driven nails.

These and other objects, features, and advantages of this invention are evident from the following description of a preferred embodiment of this invention with reference to the accompanying drawing.

Figure 1:
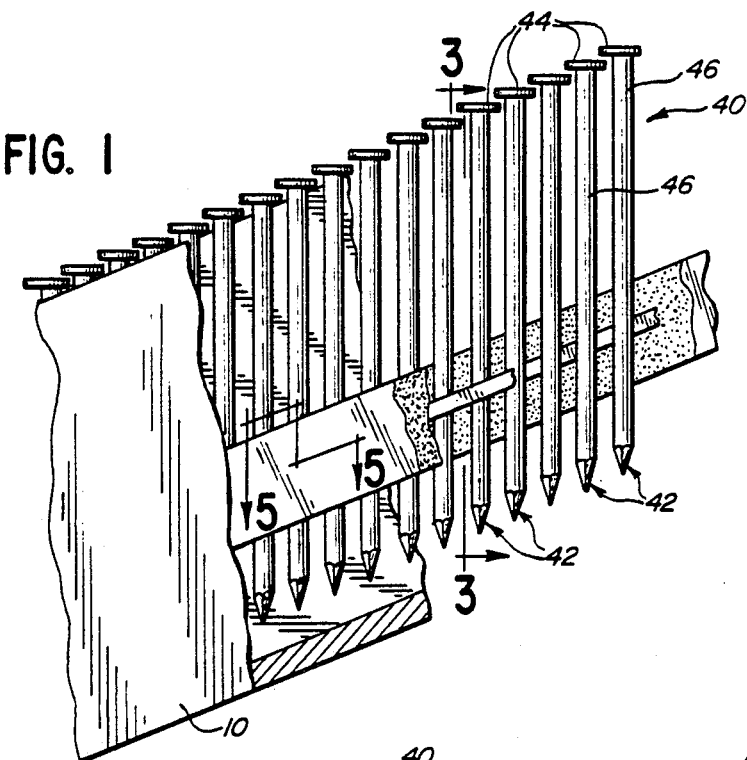
FIG. 1 is a fragmentary, elevational view of a substitute strip of collated nails residing in a nail-feeding magazine of a rapidly acting, nail-driving tool, the substitute strip constituting a preferred embodiment of this invention.

In the drawing, a channel element of the nail-feeding magazine is shown, other elements of the nail-feeding magazine and the nail-driving tool being omitted. Moreover, the channel element is shown in a simplified form, which suggests dimensional relationships between the nails and the channel element, but which omits unnecessary details.

DETAILED DESCRIPTION OF PREFERRED EMBODIMENTS

Figure 2:
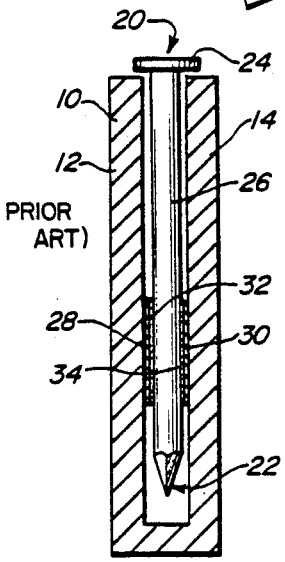
FIG. 2 is a cross-sectional view of a standard prior art a strip of collated nails residing in the nail-feeding magazine shown in FIG. 1, in place of the substitute strip of collated nails, as taken between two nails of the standard strip.

As shown, a channel element 10 of a nail-feeding magazine (not otherwise shown) of a pneumatically powered, combustion-powered, or other rapidly acting, nail-dirving tool (not otherwise shown) has lateral walls 12, 14, which are adapted structurally and dimensionally, in a known manner, to feed a standard strip 20 (See FIG. 2) of collated nails 22 (one shown) having full heads 24 in a tiered relationship, and cylindrical shanks 26 of a uniform diameter.

The nails 22 of the standard strip 20 are collated, essentially in the manner disclosed in the Langas et al. patent noted above, by a pair of tapes 28, 30, 3ach of which extend across the nail shanks 26 and is adhered to a respective one of diametrically opposed areas on the shank 26 of each nail 22. Layers 32, 34, of heat-sensitive adhesive are used to adhere the respective tapes 28, 30, to the nail shanks 26. The respective tapes 28, 30, have paper substrates, which may have polymeric coatings for enhanced lubricity.

The standard strip 20 has an overall width, as measured at the collating tapes 28, 30, which is selected so as to enable the channel element 10 and other elements of the nail-feeding magazine to feed the standard strip 20 without allowing the nail shanks 26 to wobble excessively, even if the standard strip 20 is one of a plurality of strips that are identical, except possibly for their nail-to-nail lengths, and that are loaded serially so as to reside simultaneously in the nail-feeding magazine.

Figure 3:
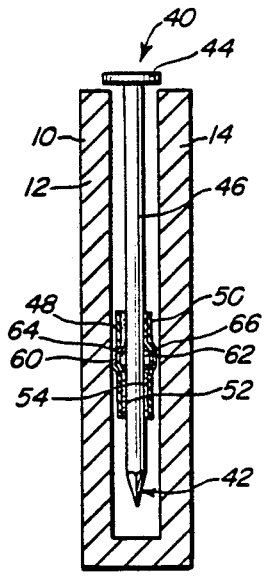
FIG. 3 is a cross-sectional view of the substitute strip of collated nails residing in the nail-feeding magazine of FIG. 1, as taken between two nails of the substitute strip, e.g., along line 3—3 of FIG. 1 in a direction indicated by arrows.
Figure 5:
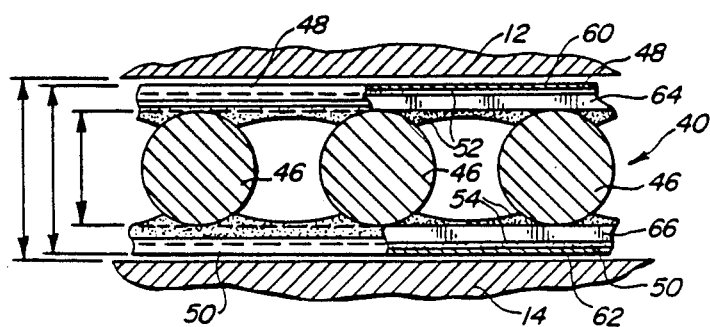
FIG. 5 is a substantially enlarged, fragmentary, sectional view of the substitute strip, as taken along line 5—5 of FIG. 1 in a direction indicated by arrows.

As shown in FIGS. 1, 3, and 5, a substitute strp 40 of collated nails 42 constitutes a preferred embodiment of this invention. The nails 42 have full heads 44 in a tiered relationship, as shown in FIG. 1, and cylindrical shanks 46 of a uniform diameter that is smaller than the diameter of the nail shanks 26 of the standard strip 20.

The nails 42 of the sustitute strip 40 and the nails 22 of the standard strip 20 may vary in their respective lengths, which do not bear on this invention.

The nails 42 of the substitute strip 40 are collated by a pair of tapes 48, 50, each of which extends across the nail shanks 46 and is adhered to a respective one of diametrically opposed areas on the shank 46 of each nail 42. Layers 52, 54, of heat-sensitive adhesive are used to adhere the respective tapes 48, 50, to the nail shanks 46. The respective tapes 48, 50, have paper substrates, which may have polymeric coatings for enhanced lubricity.

Each of the tapes 48, 50, has an outer rib extending along such tape. Thus, the tape 48 has an outer rib 60 extending along the tape 48, and the tape 50 has an outer rib 62 extending along the tape 50. A threadlike strip 64 which comprises the core or body of the rib, and which may be advantageously made of compressed paper, extends along the tape 48, between the tape 48 and the nail shanks 46, preferably between the adhesive layer 52 and the nail shanks 46, as shown, or alternatively between the tape 48 and the adhesive layer 52, so as to define the body of the outer rib 60. A threadlike strip 66 which comprises the core or body of the rib, and which may be similarly made, extends along the tape 50, between the tape 50 and the nail shanks 46, preferably between the adhesive layer 54 and the nail shanks 46, as shown, or alternatively between the tape 50 and the adhesive layer 54, so as to define the body of the outer rib 62. The threadlike strips 64, 66, are attached to the nail shanks 46 solely by the tapes 48, 50, respectively and the adhesive layers 52, 54, respectively.

The outer ribs 60, 62, compensate for the nail shanks 46 of the substitute strip 40 being of a smaller diameter than the nail shanks 26 of the standard strip 20, by causing the overall width of the substitute strip 40, as measured at the outer ribs 60, 62, to be approximately equal to the overall width of the standard strip 20, as measured at the tapes 28, 30. By doing so, the outer ribs 60, 62, enable the nail-feeding magazine including the channel element 10 to feed the substitute strip 40 without allowing the nail shanks 46 to wobble excessively.

Because of the outer ribs 60, 62, the substitute strip 40 and the standard strip 20 can be interchangeably fed by the nail-feeding mechanism noted above, so as to lend enhanced utility to the nail-driving tool including the nail-feeding mechanism noted above.

Figure 4:
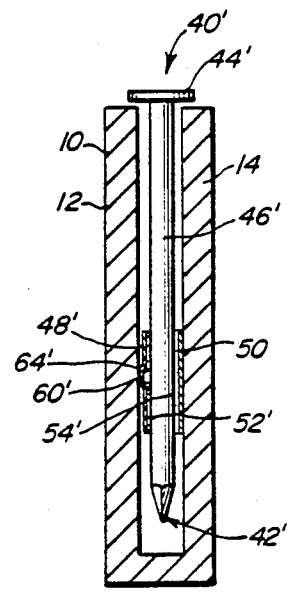
FIG. 4 is a cross-sectional view of an alternative form of a substitute strip of collated nails residing in the nail-feeding magazine of FIG. 1, as taken between two nails of the alternative form of a substitute strip.

As shown in FIG. 4, in which elements with primed reference numbers are analogous to elements with unprimed reference numbers in FIG. 3, a substitute strip 40' of collated nails 42' (one shown) having full heads 44' in a tiered relationship and cylindrical shanks 46' of a uniform diameter that is smaller than the diameter of the nail shanks 26 of the standard strip 20 but larger than the diameter of the nail shanks 46 of the substitute strip 40 may be also fed into the nail-feeding magazine 10.

The nails 41' of the substitute strip 40' are collated by a pair of tapes 48', 50', each of which extends across the nail shanks 46' and is adhered to a respective one of diametrically opposed areas on the shank 46' of each nail 42'. Layers 52', 54', of heat-sensitive adhesive are used to adhere the respective tapes 48', 50', to the nail shanks 46'. The respective tapes 48', 50', have paper substrates, which may have polymeric coatings for enhanced lubricity.

The tape 48' has an outer rib 60' extending along the tape 48'. The tape 50' does not have such a rib. A threadlike strip 64', which may be advantageously made of compressed paper, extends along the tape 48', preferably between the adhesive layer 52' and the nail shanks 46', as shown, or alternatively between the tape 48' and the adhesive layer 52', so as to define the body of the outer rib 60'. The threadlike strip 64' is attached to the nail shanks 46 solely by the tape 48' and the adhesive layer 52'.

The outer rib 60' compensates for the nail shanks 46' of the substitute strip 40' being of a smaller diameter than the nail shanks 26 of the standard strip 20, by causing the overall width of the substitute strip 40', as measured at the outer rib 60', to be approximately equal to the overall width of the standard strip 20, as measured at the tapes 28, 30. By doing so, the outer rib 60' enables the nail-feeding magazine including the channel element 10 to feed the substitute strip 40' without allowing the nail shanks 46' to wobble excessively.

Although the nail heads 24 of the standard strip 20, the nail heads 44 of the substitute strip 40, and the nail heads 44' of the substitute strip 40' are in tiered relationships, this invention is applicable also to a collated nail strip having nail heads in a coplanar relationship for use in a nail-feeding magazine designed for a collated nail strip having nail heads in a coplanar relationship.

Although the nail heads 24 of the standard strip 20, the nail heads 44 of the substitute strip 40, and the nail heads 44' of the substitute strip 40' are full heads, this invention is applicable also to a collated strip of nails having D-shaped heads.

Other modifications may be also made without departing from the scope and spirit of this invention.

We claim:

1. For use in a nail-feeding magazine, which is adapted to feed a standard strip of collated nails, the nails of the standard strip having cylindrical shanks of a uniform diameter and being collated by at least one pair of tapes, each tape of each pair of tapes of the standard strip extending across the shanks of the nails of the standard strip and being adhered to a respective one of diametrically opposed areas on the shank of each nail of the standard strip, the standard strip having an overall width, as measured at each pair of tapes of the standard strip, which width is selected so as to enable the nail-feeding mechanism to feed the standard strip without allowing the shanks of the nails of the standard strip to wobble excessively:

a substitute strip of collated nails having cylindrical shanks of a uniform diameter smaller than the diameter of the shanks of the nails of the standard strip and being collated by at least one pair of tapes, each tape of each pair of tapes of the substitute strip extending across the shanks of the nails of the substitute strip and being adhered by an adhesive layer to a respective one of diametrically opposed areas on the shank of each nail of the substitute strip, at least one tape of at least one such pair of such tapes of the substitute strip having an outer rib extending along such tape, the outer rib constituting means for compensating for the shanks of the nails of the substitute strip being of a smaller diameter than the shanks of the nails of the standard strip, and for causing the overall width of the substitute strip, as measured at the outer rib of each such pair of tapes of the substitute strip, to be approximately equal to the overall width of the standard strip, which lacks such a rib, so as to enable the nail-feeding magazine to feed the substitute strip without allowing the shanks of the nails of the substitute strip to wobble excessively.

2. The substitute strip of nails of claim 1 wherein the outer rib is defined by an elongated strip of material disposed along the strip of nails and attached to the shanks of the nails of the substitute strip solely by the tape having the outer rib and the adhesive layer adhering the tape having the outer rib.

3. The substitute strip of claim 1 wherein the outer rib does not extend across the full width of the tape having the outer rib.

4. The substitute strip of claim 1 wherein each tape of at least one pair of tapes of the substitute strip has an outer rib extending along such tape, the outer ribs constituting means for compensating for the shanks of the nails of the substitute strip being of a smaller diameter than the shanks of the nails of the standard strip, and for causing the overall width of the substitute strip, as measured at the outer ribs of each such pair of tapes of the substitute strip, to be approximately equal to the overall width of the standard strip, which lacks such a rib, so as to enable the nail-feeding mechanism to feed the substitute strip without allowing the shanks of the nails of the substitute strip to wobble excessively.

5. The substitute strip of claim 4 wherein each outer rib is defined by an elongated strip of material disposed along the nails of the substitute strip and attached to the shanks of the nails of the substitute strip solely by the tape having such outer rib and the adhesive layer adhering the tape having such outer rib.

6. The substitute strip of claim 4 wherein the outer ribs do not extend across full widths of the tapes having the outer ribs.

7. The substitute strip of claim 1 wherein the outer rib is continuous.

8. The substitute strip of claim 4 wherein the outer ribs are continuous.

* * * * *